UNITED STATES PATENT OFFICE.

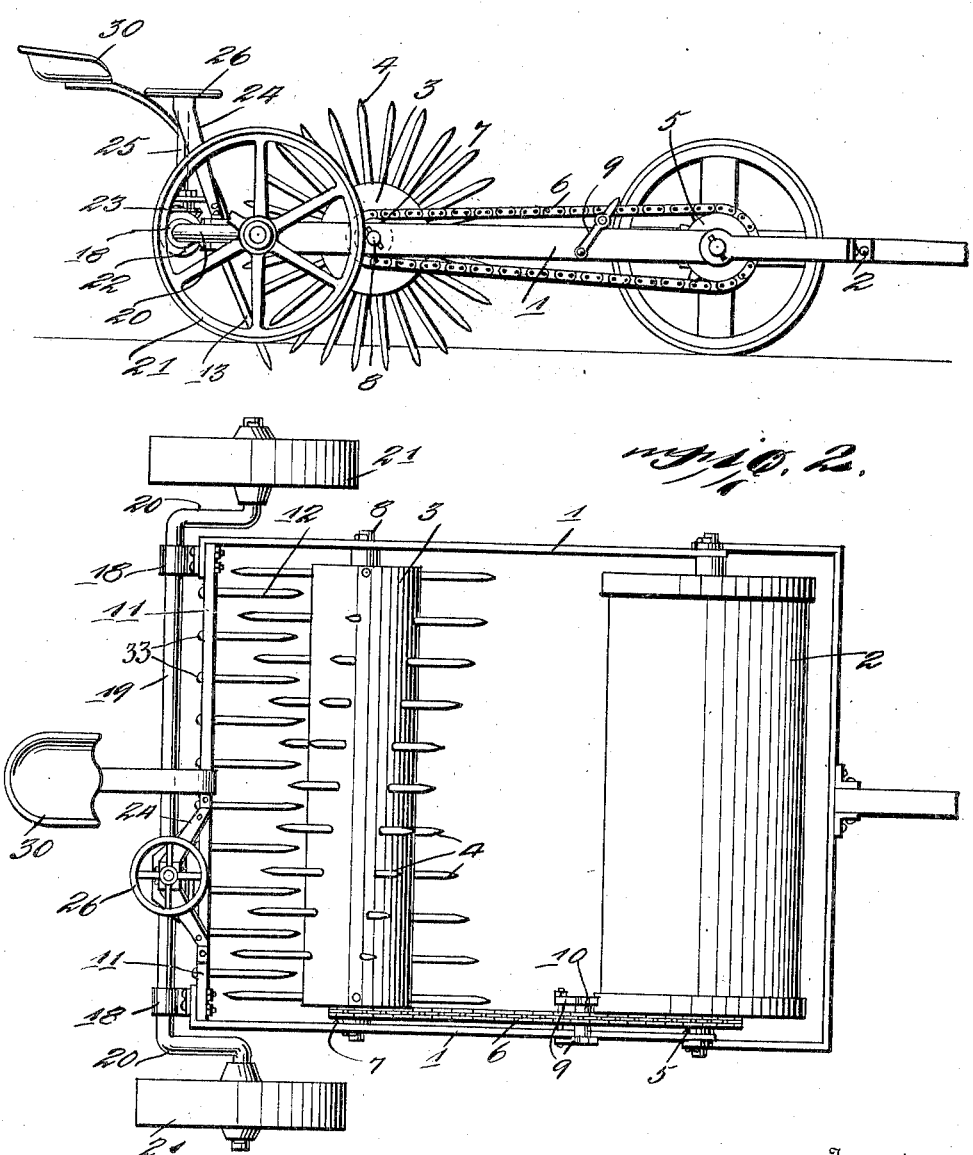

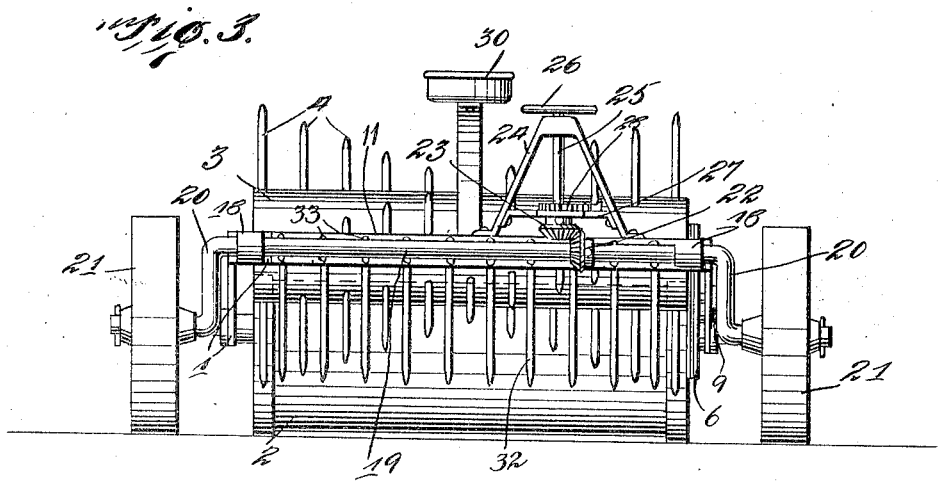
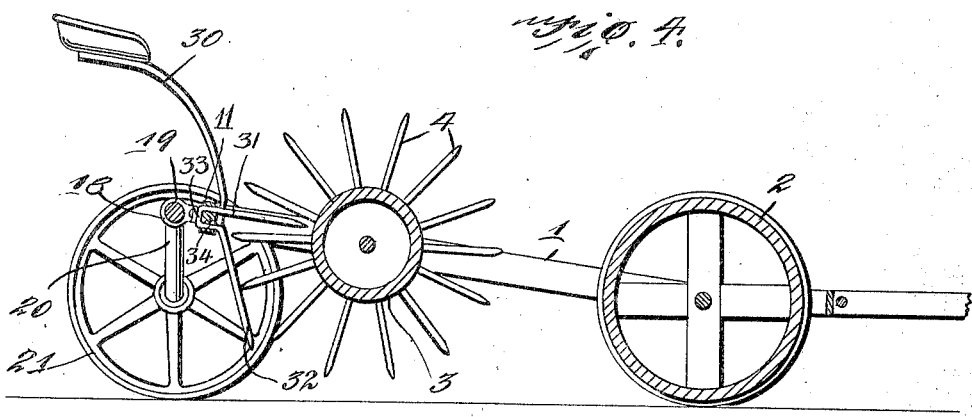
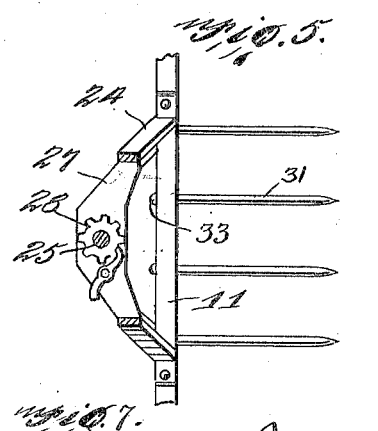
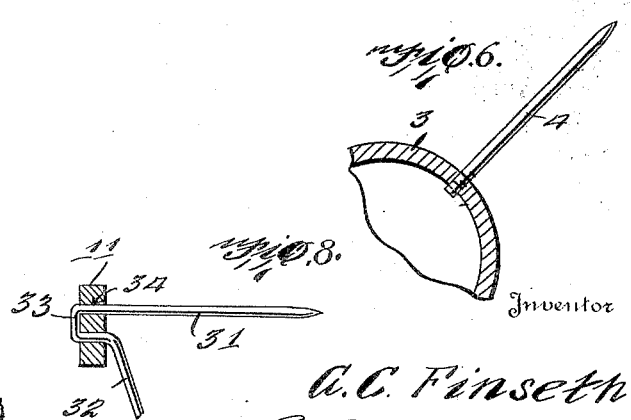
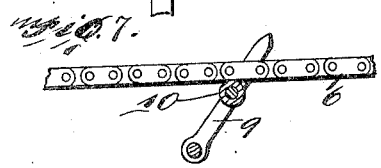

ALBERT C. FINSETH, OF EUGENE, OREGON, ASSIGNOR OF ONE-HALF TO GEORGE E. ROBINSON, OF EUGENE, OREGON.

THRESHING-HARROW.

1,315,918.     Specification of Letters Patent.     Patented Sept. 9, 1919.

Application filed June 29, 1916, Serial No. 106,697. Renewed February 6, 1919. Serial No. 275,456.

*To all whom it may concern:*

Be it known that I, ALBERT C. FINSETH, a citizen of the United States, residing at Eugene, in the county of Lane and State of Oregon, have invented certain new and useful Improvements in Threshing-Harrows, of which the following is a specification, reference being had therein to the accompanying drawing.

This invention relates to a threshing harrow and has for its object the production of a simple and efficient harrow mechanism whereby the teeth may be at all times kept clean and free from entanglement of the undergrowth picked up from the ground or soil over which the device may be traveling.

Another object of this invention is the production of a simple and efficient means for raising and lowering the body of the machine to such a position as to throw the harrow roller into and out of operative position.

With these and other objects in view, this invention consists of certain novel constructions, combinations and arrangements of parts as will be hereinafter fully described and claimed.

In the drawings:

Figure 1 is a side elevation of the machine in operation.

Fig. 2 is a top plan view thereof.

Fig. 3 is a rear elevation of the device showing the harrow roller in an elevated position.

Fig. 4 is a central longitudinal section through the machine.

Fig. 5 is a horizontal section taken through the mechanism for raising and lowering the machine.

Fig. 6 is an enlarged transverse section through a portion of the harrow roller showing the teeth carried thereby.

Fig. 7 is a transverse section through the chain guide used upon the present machine.

Fig. 8 is a detail view of the manner of connecting the cleaner teeth with the cleaner bar.

By referring to the drawings, it will be seen that 1 designates the frame, which frame supports a forward roller 2 and a rear harrow roller 3. This harrow roller 3 carries a plurality of digging or harrow teeth 4 which harrow teeth 4 are arranged in a plurality of rows extending oblique to the longitudinal axis of the harrow roller 3. The arrangement of these teeth is clearly shown in Fig. 2 of the drawing. This roller 2 carries a sprocket wheel 5 over which sprocket wheel 5 passes a sprocket chain 6, which sprocket chain 6 also passes over a sprocket wheel 7 carried by the shaft 8 which supports the harrow roller 3. A chain supporting member 9 is pivotally secured to the sides of the frame 1 and is provided with a transversely extending roller 10 for engaging the under face of the chain 6 and preventing the chain from sagging while in operation.

The frame 1 carries a rear cleaner bar 11 which bar carries a plurality of horizontally extending cleaner teeth 31 and a plurality of downwardly inclined cleaner teeth 32. The horizontally extending teeth 31 and the depending teeth 32 are formed of one continuous piece of metal or wire. The teeth 31 and 32 are bent parallel to each other for producing a loop 33 which loop 33 engages the rear ends of the cleaner bar 11, the teeth 31 and 32 passing through the apertures 34 formed in the cleaner bar 11.

These teeth 31 and 32 are adapted to fit between the teeth 4 carried by the roller 3 and are adapted to facilitate the removal of the undergrowth, vines and the like from the harrow teeth 4 as the roller 3 rotates. In this manner it will be seen that the harrow roller will be kept free at all times from the undergrowth and at each rotation the teeth 4 will enter the ground or soil in a cleaned condition.

A plurality of journal plates 18 are secured to the rear portion of the frame 1 and an axle 19 is mounted within these journal plates 18. The axle 19 is provided with downwardly extending offset ends 20 which ends support the wheels 21 as illustrated clearly in Figs. 1 and 4 of the drawings. This axle shaft 19 carries a gear 22 which gear 22 meshes with a gear 23 carried by the frame 24. This frame 24 supports an operating shaft 25 which operating shaft 25 carries a hand wheel 26, the shaft 25 being journaled upon the frame 24 and also passing through a bridge 27 carried by the frame 24. A ratchet wheel 28 is carried by the shaft 25 and a dog or pawl 29 is adapted to engage this ratchet wheel 28 for holding the shaft 25 in set position against rotation.

A suitable seat 30 is supported upon the frame 1 and the hand wheel 26 is preferably placed adjacent this seat to permit the operator to raise and lower the frame at will.

It should be understood that when the harrow roller is in operation, the wheels 21 are raised by swinging the opposite ends 20 of the axle 19 forwardly thereby throwing the teeth 4 of the harrow roller into engagement with the ground. This is accomplished by rotating the hand wheel 26, first releasing the pawl 29 from engagement with the ratchet wheel 28. It should be understood that as the wheel 26 is rotated, the gear wheel 23 will also rotate thereby imparting rotary movement to the gear wheel 22 and rotating the shaft 19 for swinging the offset ends 20 in the desired direction. When the harrow roller 3 is not in use the wheels can be swung downwardly to such a position as is shown in Fig. 4 and also in Fig. 3, thereby drawing the harrow teeth 4 out of engagement with the ground for permitting the device to be moved from place to place without digging up the ground over which the machine may be passing.

What is claimed is:

1. A machine of the class described comprising a frame, a harrow roller supported thereby, a plurality of cleaner teeth, comprising an upper row of horizontal teeth and a lower row of downwardly inclined teeth, the upper and lower teeth being formed of a single strand of wire provided with a rearwardly extending loop, a cleaner bar supporting said teeth and being supported by said frame, said loop passing through said cleaner bar for fixedly securing said teeth in engagement with said cleaner bar.

2. A machine of the class described comprising a frame, a cleaner bar and a harrow roller supported upon said frame, a plurality of cleaner teeth comprising an upper row of horizontal teeth and also a row of downwardly inclined teeth supported upon said bar, the upper and lower teeth being formed of a single strand of wire, and said wire being looped through said cleaner bar whereby said teeth will be firmly held in engagement with said bar.

In testimony whereof I hereunto affix my signature.

ALBERT C. FINSETH.

Copies of this patent may be obtained for five cents each, by addressing the "Commissioner of Patents, Washington, D. C."